United States Patent [19]

Lu

[11] Patent Number: 5,425,991
[45] Date of Patent: Jun. 20, 1995

[54] RELEASE SHEET

[75] Inventor: Pang-Chia Lu, Pittsford, N.Y.

[73] Assignee: Mobil Oil Corporation, Fairfax, Va.

[21] Appl. No.: 217,811

[22] Filed: Mar. 25, 1994

[51] Int. Cl.6 .......................... B32B 7/12; B32B 27/30
[52] U.S. Cl. ........................................ 428/352; 428/40;
428/447; 428/451; 428/345; 526/279; 524/806;
525/479
[58] Field of Search ................. 428/40, 352, 354, 447,
428/451, 345; 526/279; 524/806; 525/479

[56] References Cited

U.S. PATENT DOCUMENTS

| 4,533,566 | 8/1985 | Evans et al. . | |
|---|---|---|---|
| 4,786,552 | 11/1988 | Sasaki et al. . | |
| 4,929,486 | 5/1990 | Itou et al. | 428/352 X |
| 4,994,538 | 2/1991 | Lee | 526/279 |
| 5,171,638 | 12/1992 | Ozaki et al. . | |
| 5,234,736 | 8/1993 | Lee | 428/40 X |
| 5,242,726 | 9/1993 | Pariseau et al. . | |
| 5,246,756 | 9/1993 | All et al. . | |
| 5,248,535 | 9/1993 | Chang et al. . | |
| 5,266,399 | 11/1993 | Babu et al. . | |

Primary Examiner—Daniel R. Zirker
Attorney, Agent, or Firm—Alexander J. McKillop; Malcolm D. Keen; Jessica M. Sinnott

[57] ABSTRACT

A composite sheet of a flexible release liner, which is useful in high speed operations is described. The release liner is coated on one side with a crosslinkable high release coating formulation comprising (a) a silicone-acrylate release component; (b) an acrylate-containing crosslinking agent, such as a silicone-acrylate crosslinking agent having a higher acrylate content than the (a) silicone-acrylate, trimethylolpropane triacrylate or epoxylated trimethylolpropane triacrylate; and (c) an acrylic ester monomer or oligomer selected from the group consisting of octyl acrylate, isodecyl acrylate, stearyl acrylate and lauryl acrylate, specifically the (c) acrylate is free of silicone and more than two acrylate groups per molecule.

21 Claims, No Drawings

RELEASE SHEET

FIELD OF THE INVENTION

The invention relates to a composite film suitable for use as a release sheet. It more specifically relates to composite films which are suitable for high speed label dispensing machines.

BACKGROUND OF THE INVENTION

Peelable labels are well known. They are constructed from a release liner upon which there is a release coating, an adhesive and a face stock. The face stock is releasably adhered to the release liner by contact with an adhesive located between the face stock and the release liner.

Typically the release liner is constructed by applying a release coating to one side of a plastic or paper liner sheet. Release coatings are characterized by an ability to strongly adhere to the liner sheet but weakly adhere to the adhesive which is located between the face stock and the liner.

The peelable label is converted into roll label stock by cutting the composite film with a die which only cuts through the face stock, not through the release liner, to form labels of specified shape. The surrounding face stock, known as the matrix, is peeled away from the release liner, leaving the labels adhered to the release liner which is then formed into a roll. The labels are usually dispensed by bending the roll stock to an angle which causes the label to lift away from the release liner. The label, released from the liner is then applied to a surface.

In composite films of this type, the release coating is usually made out of an electron beam curable composition which, typically includes a silicone resin having crosslinkable groups, such as acrylic residues. The silicone portion of the composition is the release agent which permits the adhesive to bond lightly to the release liner. The acrylic groups crosslink the release coating composition together and permit the release coating to form a strong bond to the surface of the liner sheet.

There are typically four levels of release force: premium release (10–15 g), easy release (20–40 g), high release (50–100 g) and tight release (>100 g). For high speed label dispensing, the release liner should have a high release force. If the release force is too low, predispensing occurs in which the labels fly off during die cutting rather than remain on the liner to form the roll stock.

Attempts to increase the release force by the addition of agents designed to strengthen the degree of release of the release coating cause unacceptable zippy noise, or zippiness, during matrix stripping and label dispensing. Zippy noise is an art-recognized term used to describe a jerking noise generated during the high speed matrix stripping process.

SUMMARY OF THE INVENTION

It is an important object of this invention to provide a release coating for use in high speed machinery which does not cause an unacceptable degree of zippy noise.

A feature of the invention is a release coating formulation which includes a mixture of (a) a silicone release component, (b) a crosslinking agent and (c) an acrylic ester.

An advantage of the invention is that a silicone-acrylate release component can now be used in a release sheet coating for use in high speed label applications without causing predispensing problems.

In one aspect of this invention the composite film comprises a base liner having a release coating adhered to at least one surface thereof. The release coating comprises a silicone release component, a crosslinking agent and an acrylic ester. The release coating is applied to a surface of the liner and then cured, usually by electron beam radiation, to form a coating with release properties suitable for high speed, high release force label applications.

An important feature of the invention is the use of an acrylic ester in the release coating formulation. Suitable acrylic esters are monomers or oligomers having long chain hydrocarbon groups. The hydrocarbon groups usually range from about 2 to about 24 carbon atoms, specifically from about 4 to about 18 carbon atoms. Specific examples of contemplated acrylic esters include octyl acrylate, isodecyl acrylate, stearyl acrylate and lauryl acrylate. These materials have viscosity ranges from about 2 to 55 cP (2 mPas to 55 mPas) at 25° C., although, at this time, it is not believed that the viscosity properties of the acrylic esters contribute to the properties of the coating.

In another aspect, this invention comprises a composite film comprising a base liner, a release coating adhered to at least one surface thereof and a face stock releasably adhered to the release coating.

DETAILED DESCRIPTION OF THE INVENTION

The invention is specifically directed to a flexible sheet comprising a film form liner having on one side thereof a crosslinkable release coating comprising a mixture of (a) a silicone-acrylate material; (b) an acrylate-containing crosslinking agent; and (c) an acrylic ester monomer or oligomer. The invention is also directed to a process of making a flexible sheet and a flexible sheet made by the process.

The film form liner is a conventional flexible film material known in this art. Examples of useful film form liner materials include paper, oriented polypropylene, polyethylene terephthalate, polyethylene, polyamides, polystyrene and the like.

The release coating is a composition which when applied to the base liner, has a low surface tack permitting ready release of other materials such as polymeric films which have been applied thereto.

The release coating formulation of this invention is, typically, crosslinkable and comprises a mixture of (a) a silicone release component; (b) a crosslinking agent; and (c) an acrylic ester.

In general, the (a) silicone release component is a polydimethyl siloxane silicone polymer which is known to have release characteristics. In general, the silicone polymers are themselves crosslinkable and have crosslinkable groups. Crosslinkable silicone polymers of this kind usually have appended acrylic residues which are the crosslinkable groups. These crosslinkable silicone release polymers typically contain from about 2% to about 30% acrylate, specifically from about 10% to about 20% acrylate. An example of a typical release coating is a silicone-acrylate copolymer described in EP 0281681-A1 to Goldschmidt AG. An example of a useful silicone-acrylate release polymer is available commercially under the name RC-726 by Goldschmidt Chemical Co.

In general the (b) crosslinking agent is present to permit bonding of the (a) silicone release component to the base liner. The crosslinking agent interacts with the acrylate by free radical reactions, typically, induced by high energy radiation, e.g. electron beam or ultra violet light. Conventional crosslinking agents can be employed in the release coating formulation. An example of a contemplated crosslinking agent is a higher acrylate content silicone-acrylate. The high acrylate content silicone-acrylate contemplated as the crosslinking agent is distinguished from the (a) silicone-acrylate by the presence of a higher concentration of the acrylate component. Typically, the (b) silicone-acrylate contains from about 5 to about 15% more acrylate than the (a) silicone-acrylate. Typically the high acrylate silicone-acrylate contains from about 10% to about 45%, more specifically from about 15% to about 30% acrylate based on the entire weight of this crosslinking agent. A high acrylate silicone-acrylate material, which contains about 28% acrylate is sold commercially under the name RC-705 by Goldschmidt Chemical Co.

Other contemplated (b) crosslinking agents are multi-functionalized acrylate monomer/oligomer materials. Multi-functionalized acrylates are usually characterized by the presence of 2 or more acrylate groups per molecule. Examples include trimethylolpropane triacrylate (TMPTA) and ethoxylated trimethylolpropane triacrylate (EO-TMPTA). The TMPTA is sold under the name "SR-351" and the EO-TMPTA is sold under the name "SR-454" both sold by Sartomer Chemical Co of Exton, Pa.

The TMPTA and/or EO-TMPTA can be used together with the high acrylate silicone-acrylate crosslinking agent to make-up the appropriate amount of crosslinker needed in the release coating. Alternatively, the TMPTA and/or EO-TMPTA or the high acrylate silicone-acrylate can be used alone.

An important feature of this invention is the presence of a (c) acrylic ester in the release coating. The (c) acrylic ester when used with (a) and (b) to form a release coating has been found to produce a high release force release coating material. The (c) acrylic ester permits the above described (a) silicone release component to be used in high speed, high release force label applications. Prior to this invention, easy release force release coatings made from (a) silicone release components or blends of (a) and (b), were unusable in high release force applications. It is believed that the addition of the (c) acrylic ester modifies the elastic property of the crosslinked silicone release coating. In one embodiment of the invention a flexible sheet containing this (c) acrylic ester in the release coating is contemplated in which the (c) coating is free of silicone.

Contemplated acrylic esters include monomeric and/or oligomeric acrylates. The acrylic esters contemplated are distinguished from the (a) and (b) silicone-acrylates described above by the absence of the silicone component. They are also distinguished from the (b) non-silicone crosslinking agent because they are usually free of more than two acrylate groups. Thus, more specifically, the acrylic ester can be defined as being free of silicone and free of more than 2 acrylate groups per molecule.

Acrylic esters are derivatives of both acrylic acid and methacrylic acid. The contemplated acrylates are specifically long chain alkyl esters containing about 2 to 24 carbon atoms, the alkyl groups can be n-alkyl and secondary and branched chain alkyl groups. Typical examples of acrylic esters include octyl acrylate, isodecyl acrylate, stearyl acrylate and lauryl acrylate. Typically the acrylic esters have a viscosity falling within the range of about 2 to 55 cP at 25° C. (2 mPas to 55 mPas). These acrylic esters are commercially available from several chemical companies, such as Sartomer, UCB Radcure and CPS Chemicals.

The release coating formulation is usually disposed on the base liner in an uncured form and is then cured to fix it in place. One of the techniques used to apply the release coating is to coat an uncured composition on a surface of the base liner and then to impinge an electron beam onto this composition for a time and under conditions suitable for converting this coating into a crosslinked film which is adhered to the surface of the base liner. Thus, the crosslinked release coating contains mostly crosslinked silicone acrylate moieties which are bound together and to the surface of the base liner. The coating can also be crosslinked by adding a UV initiator and then exposing the coating to UV light. Typical UV initiators are benzophenone and benzophenone derivatives.

The face stock is a conventional film form material. Examples of suitable materials are films of paper, polyethylene terephthalate, polyethylene, polystyrene, metal foils and the like.

The adhesive is any material which will bond weakly to the release liner and strongly to the face stock. Examples of known adhesives include acrylic emulsions, such as those sold commercially under the name XPLA-12, by the Dyna-tech Company, styrene-butadiene rubber emulsions, such as those sold under the name Bond-master 72-9718 by National Starch Company, and hot-melt adhesives, such as those sold under the trade name HL-2021, or HL-2203X by the H. B. Fuller Company.

Included within the scope of this invention is a base liner provided with a skin of a material having tougher physical properties, adjacent to the release coating. This base liner is designed to facilitate label cutting. When the face stock, which is releasably secured to the release coating, is die cut into suitable shapes, the cutting die is prevented from penetrating and cutting through the base liner by the presence of the tougher skin layer.

The proportion of each component described above in the release coating formulation, based on the entire coating formulation, ranges from about 15 to about 70%, specifically from about 20 to about 50%, of the (a) silicone release component; from about 10% to about 50%, specifically from about 15% to about 30% of the (b) crosslinking agent; and from about 10% to about 50%, specifically from about 20% to about 40% of the (c) acrylic ester.

In the following examples, parts and percentages are by weight unless expressly stated to be on some other basis. These examples were actually conducted.

EXAMPLE 1

A release coating was formulated from a curable silicone-acrylate release component (RC-726 manufactured by Goldschmidt Chemical Co.), various proportions of the crosslinking agents, ethoxylated trimethylolpropane triacrylate (EO-TMPTA) and high acrylate silicone acrylate (HASA), and isodecyl acrylate. The formulated release coating was coated onto a 2.0 mil oriented polypropylene film. After application of the release coating, the film was radiation cured by exposure to 2.5 Mrad electron beam radiation on an ESI Electrocurtain CB 150 laboratory EB unit. The release force of each coated release liner was tested by a TLMI tester. The TLMI tester is manufactured by TMI Co., of Amityville, N.Y. In the test the sandwich laminate is cut into a 1 inch (25.4 mm) width. After aging for 24 hours, the face stock is peeled away at a 180° angle at a speed of 300 in/minute (1,270 mm/s). The peel force is reported as the release force. The results are reported below in Table 1.

The release liners were laminated to a high release force adhesive tape. The peel force at a speed of 3 and 5 meters per second was measured with IMASS tester. The IMASS tester is used to measure the release force for high speed operation. The tester used was model ZPE-1000, manufactured by Instrumentors, Inc., Strongsville Ohio which can be operated at speeds of 0.5 to 5.0 meters per second. The results are reported in Table 1.

labels under high speed applications. The data reported in Table 1 show that silicone acrylate based release coatings formulated with a crosslinking agent, such as high acrylate silicone acrylate and/or ethoxylated trimethylolpropane triacrylate and an acrylate monomer achieve a high release force (>50 g) with only slight or no zippy noise. Varying the proportion of each component can optimize release coating performance. Additionally, as shown in Table 2, the amount of predispensed labels at high speeds is minimized by the use of the coating formulation of this invention.

What is claimed is:

1. A flexible sheet comprising a film form liner having on one side thereof a crosslinkable release coating comprising a mixture of (a) from about 15 to about 70% of a silicone-acrylate composition based on the weight of the coating mixture; (b) an acrylate-containing crosslinking agent; and (c) an acrylic ester monomer or oligomer.

TABLE 1

| SAMPLE # | Composition % | | | | Release Force (TLMI) 24 hr. (g) | High Speed Peel Force (IMASS) | | Zippy noise (IMASS test) |
| | SA[1] | HASA[2] | EO-TMPTA[3] | isodecyl acrylate | | 3 m/s (g) | 5 m/s (g) | |
| --- | --- | --- | --- | --- | --- | --- | --- | --- |
| 1 | 50 | 50 | — | — | 30 | 25 | 13 | no |
| 2 | 30 | 70 | — | — | 35 | 30 | 20 | no |
| 3 | 50 | — | 20 | 30 | 88 | 57 | 38 | no |
| 4 | 67 | — | 13 | 20 | 64 | 84 | 58 | no |
| 5 | 33 | — | 27 | 40 | 98 | 73 | 62 | slight |
| 6 | 20 | 48 | — | 32 | 157 | 103 | 84 | slight |
| 7 | 35 | 39 | — | 26 | 78 | 104 | 80 | no |
| 8 | 50 | 30 | — | 20 | 105 | 159 | 108 | slight |
| 9 | 50 | 25 | 25 | — | 280 | 43 | 34 | no |
| 10 | 50 | — | 25 | 25 | 45 | 54 | 48 | no |
| 11 | 50 | 25 | — | 25 | 46 | 77 | 68 | no |
| 12 | 50 | 20 | — | 30 | 52 | 74 | 70 | no |
| 13 | 40 | 20 | — | 40 | 80 | 95 | 87 | slight |
| 14 | 55 | 15 | — | 30 | 55 | 75 | 51 | no |

[1]SA = Silicone Acrylate
[2]HASA = High Acrylate Silicone Acrylate
[3]EO-TMPTA = Ethoxylated Trimethylolpropane Triacrylate

EXAMPLE 2

Samples 1 to 8 were laminated to 60# high gloss paper face stock with a hot melt adhesive on a laboratory Mercer laminator. The laminates were then evaluated for their die cut performance on the Allied Gear FlexmasterlB die cut machine with a ¾" circular die and the results are reported in Table 2. The percent predispense was determined by counting the number of labels predispensed during matrix stripping at 200 fpm (60.96 m/min) and 500 fpm (152.40 m/min).

TABLE 2

| Sample # (Table 1) | % Predispense at | | Zippiniess During matrix Stripping |
| | 200 fpm | 500 fpm | |
| --- | --- | --- | --- |
| 1 | 95 | 100 | None |
| 2 | 98 | 99 | None |
| 3 | 0 | 2 | Slight |
| 4 | 2 | 5 | None |
| 5 | 0 | 1 | Moderate |
| 6 | 0 | 1 | Slight |
| 7 | 5 | 10 | None |
| 8 | 0 | 3 | Slight |

The data of Tables 1 and 2 show that release coating formulations made in accordance with this invention increase the release force of a silicone-acrylate release component and reduce the percentage of predispensed 2. The flexible sheet of claim 1 in which the (a) silicone-acrylate composition comprises about 5 to about 30% acrylate.

3. The flexible sheet of claim 1 in which the (b) crosslinking agent is a silicone-acrylate having an acrylate content which is from about 5 to about 15% greater than the acrylate content of the (a) silicone-acrylate composition.

4. The flexible sheet of claim 3 in which the (b) silicone-acrylate has an acrylate content ranging from about 10% to about 45%.

5. The flexible sheet of claim 1 in which the (b) crosslinking agent is selected from the group consisting of multi-functionalized acrylate monomers and oligomer.

6. The flexible sheet of claim 1 in which the (b) crosslinking agent is selected from the group consisting of trimethylolpropane triacrylate and ethoxylated trimethylolpropane triacrylate.

7. The flexible sheet of claim 4 which further comprises as the (b) crosslinking agent a crosslinking agent selected from the group consisting of trimethylolpropane triacrylate, ethoxylated trimethylolpropane triacrylate and mixtures thereof.

8. The flexible sheet of claim 1 in which the (c) acrylic ester is an alkyl acrylate monomer or oligomer in which the alkyl group contains from about 2 to about 24 carbon atoms.

9. The flexible sheet of claim 8 in which the (c) acrylic ester is selected from the group consisting of octyl acrylate, isodecyl acrylate, stearyl acrylate and lauryl acrylate.

10. The flexible sheet of claim 1 in which the amount of (b) ranges from about 10 to about 50% and the amount of (c) ranges from about 10% to about 50% based on the entire weight of the mixture.

11. The flexible sheet of claim 1 in which the film form liner is at least one member selected from the group consisting of paper, oriented polypropylene, polyethylene, polyethylene terephthalate, polyamide and polystyrene.

12. The flexible sheet of claim 1 in which the crosslinkable release coating is radiation cured.

13. The flexible sheet of claim 1 in which the sheet further comprises a tacky adhesive coating adhered to an outer surface of the release coating, the outer surface being located opposite to a surface of the release coating which is adjacent to the liner.

14. The flexible sheet of claim 13 in which the sheet further comprises a face film stock secured to an outer surface of said adhesive coating, the outer surface being located opposite to a surface of the adhesive coating which is adjacent to the release coating.

15. A flexible sheet comprising a film form liner having on one side thereof a crosslinkable release coating comprising a mixture of (a) about 15 to about 70% of a silicone-acrylate release composition based upon the weight of the coating mixture; (b) an acrylate-containing crosslinking agent selected from the group consisting of one or more of a silicone-acrylate crosslinking agent having an acrylate content which is from about 5 to about 15% greater than the content of the (a) silicone-acrylate release composition, trimethylolpropane triacrylate or epoxylated trimethylolpropane triacrylate; and (c) an acrylic ester monomer or oligomer selected from the group consisting of octyl acrylate, isodecyl acrylate, stearyl acrylate and lauryl acrylate.

16. The flexible sheet of claim 15 in which the amount of (a) ranges from about 15 to about 70%; the amount of (b) ranges from about 10 to about 50% and the amount of (c) ranges from about 10% to about 50% based on the entire weight of the mixture.

17. The flexible sheet of claim 15 in which the film form liner is at least one member selected from the group consisting of paper, oriented polypropylene, polyethylene, polyethylene terephthalate, polyamide and polystyrene.

18. The flexible sheet of claim 15 in which the crosslinkable release coating is radiation cured.

19. The flexible sheet of claim 18 in which the sheet further comprises a tacky adhesive coating adhered to an outer surface of the release coating, the outer surface being located opposite to a surface of the release coating which is adjacent to the liner.

20. The flexible sheet of claim 19 in which the sheet further comprises a face film stock secured to an outer surface of said adhesive, the outer surface being located opposite to a surface of the adhesive coating which is adjacent to the release coating.

21. The flexible sheet of claim 15 in which the (c) acrylate is free of silicone.

* * * * *